June 12, 1951  D. B. PARKINSON  2,556,704
COUNTING CIRCUIT
Filed March 13, 1950
FIG. 1
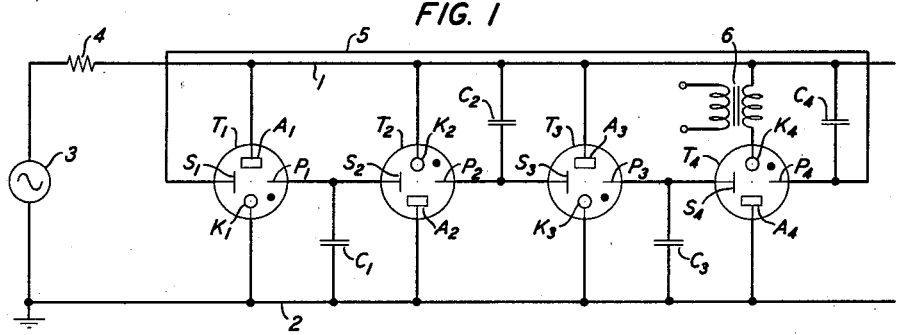
FIG. 2
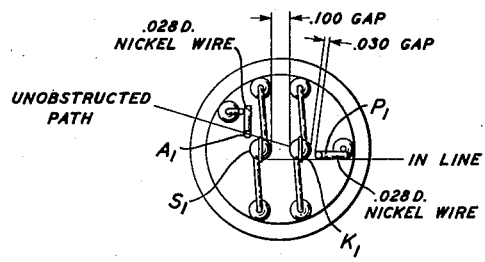
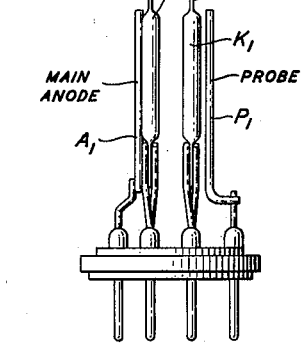
FIG. 3
FIG. 4
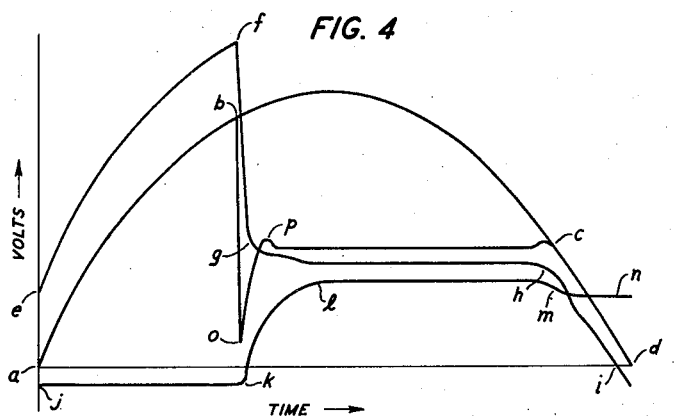
INVENTOR
D. B. PARKINSON
BY
J. W. Schmied
ATTORNEY Patented June 12, 1951

2,556,704

UNITED STATES PATENT OFFICE 2,556,704

COUNTING CIRCUIT

David B. Parkinson, Cleveland Heights, Ohio, assignor to Bell Telephone Laboratories, Incorporated, New York, N. Y., a corporation of New York Application March 13, 1950, Serial No. 149,327

6 Claims. (Cl. 315—323)

This invention relates to counting circuits and more particularly to gas tube counting ring circuits responsive step by step to the successive alternations of an alternating-current input potential.

This invention also relates to new and improved coupling circuits for connecting a first tube to a second tube.

An object of this invention is to count successive alternating-current impulses.

Another object of this invention is to simplify counting circuits.

Another object of this invention is to simplify electronic coupling circuits.

A counting circuit of the class to which this invention belongs usually comprises a series of two or more gas tubes connected to one another in such a manner that a first tube which has been ionized by a voltage impulse performs a priming action on a second tube which immediately follows the first tube in a series or chain, said priming of the second tube preparing it for subsequent ionization. Thereafter in response to a second voltage impulse the primed second tube is ionized, the first tube having been deionized by circuit means for removing the ionization sustaining potential. The ionization of the second tube primes a third tube which is subsequently ionized in response to still another voltage impulse, the second tube being deionized in manner identical with the deionization of the first tube. The circuit is ultimately made reentrant so that ionization of the last tube in the series or chain primes the first tube in the chain, thus creating what is known in the art as a counting ring.

Counting ring circuits employing gas discharge tubes heretofore known have operated in various ways, but the circuit elements used therein for coupling the gas tubes into a ring connection have been numerous and critical as to values. In accordance with this invention there is disclosed a stable counting ring circuit having a minimum of coupling elements. In particular, a novel circuit arrangement is employed to couple the gas tubes into a ring connection which includes an electrostatic potential probe electrode within each gas tube envelope and a capacitor externally connected to said probe electrode. This feature of the invention lends itself to a counting circuit design requiring only one tube and one capacitor for each stage.

In general, with respect to the circuit of this invention, priming is accomplished as follows: A given tube, having broken down in its main anode-cathode space path and being in an ionized state, supplies current to a probe electrode positioned in said space path to charge a capacitor to a given potential. This capacitor potential is applied to the starter anode-cathode space path of the tube next in the chain with such a polarity that when an impulse to be counted is applied, the second tube will have a greater potential difference across its starter anode-cathode space path than any other tube in the chain and it will therefore break down locking out the other tubes in the chain. This ionizing step from a first tube to a second tube charges the capacitor connected to the probe electrode of the second tube thereby priming a third tube in the chain. The step process repeats itself so long as voltage impulses are applied in succession to the circuit.

The potential probe electrodes used herein are to be distinguished from so-called voltage tapping electrodes. With respect to gas tube structural arrangements a given first electrode positioned in a gaseous space path may be either a potential probe or a voltage tapping electrode. Certain external circuit connections, which will determine the potential of the first electrode with respect to a second electrode, assign to the first electrode certain determinative characteristics. If said first electrode floats potentialwise in a space path in the sense that its only circuit connection to other electrodes in said space path is through an extremely high resistance direct-current path, then said electrode will assume a potential slightly lower than that of the gaseous region surrounding it and is known as a potential probe; whereas, if said first electrode is connected to said second electrode through a resistance path of lower resistance value, then said first electrode assumes a potential substantially equal to said second electrode and is known as a voltage tapping electrode. For further information concerning probe electrode theory reference is made to "Electronics" by Millman and Seely, first edition, pages 314 to 320 and 27 General Electric Review pages 449, 538, 616, 762, 810 (1924).

As used herein an electrode positioned in the main anode-cathode space path of each gas tube acquires probe characteristics in that the only external circuit connection to a second electrode, i. e., cathode, is through a capacitor. In accordance therewith the probe electrode passes current during ionization of the main anode-cathode space path until the capacitor charges to a potential slightly lower than that of the gas region surrounding the probe electrode. This arrangement provides for circuit connections to a tube electrode which is isolated from the main space path electrodes but which is none the less responsive to the ionization of said space path.

A feature of this invention is that a probe electrode is preferably employed in conjunction with cold cathode gas tubes, as tubes of this type which usually operate in the glow discharge region have a higher sustaining potential than hot cathode tubes which usually operate in the arc discharge region. Because the sustaining potential is larger in cold cathode type tubes, probe impulses received therefrom are of a greater magnitude than those obtained in hot cathode type tubes.

A second feature of this invention is that the voltage impulses to be counted by the ring circuit or, in another sense the impulses that cause tube stepping, must be of alternate polarity. That is, a positive impulse must be followed by a negative impulse and so on. This requirement is necessary in that a primed tube can only be ionized by an impulse of opposite polarity with respect to that which ionized the tube immediately preceding it in the ring connection. This potential requirement also serves a second necessary function in that it extinguishes the ionized priming tube preceding the primed tube by lowering the potential applied to the main anode-cathode space path of the priming tube to a value less than the sustaining potential.

The invention comprises certain novel features of construction and combination of electrical components the essential elements of which are set forth in the appended claims and a preferred form or embodiment of which is hereinafter described with reference to the drawings in which:

Fig. 1 is a schematic circuit diagram of the invention employing four cold cathode gaseous discharge tubes;

Fig. 2 is a plan view of the electrode structure of a tube for use in the circuit of Fig. 1 including among the elements thereof a potential probe;

Fig. 3 is a front view of the tube of Fig. 2 with the glass envelope removed; and Fig. 4 is a set of curves indicating the operative potentials with respect to ground of various points of the circuit of Fig. 1.

Fig. 1 shows four gaseous discharge tubes $T_1$, $T_2$, $T_3$ and $T_4$ connected in an endless operative chain. Each of the tubes may be structurally identical; however, this is not a necessary condition so long as the tubes employed have the proper operative characteristics. The corresponding electrodes of tubes $T_1$, $T_2$, $T_3$ and $T_4$ are designated by the same reference characters with appropriate subscripts. For purpose of general description the structure of tube $T_1$ which is shown in Figs. 2 and 3 will be referred to specifically as it can be representative of the tube structure for the other tubes. Each of said tubes has four electrodes such as starter anode $S_1$, main anode $A_1$, cathode $K_1$ and electrostatic potential probe $P_1$ which is positioned electrostatically in the main anode-cathode space path. The main anode-cathode space path of each of the tubes is connected in parallel by conductors 1 and 2, with a reversal of space path connection for each tube as compared to the space path connection of the tube immediately preceding it in the chain. This type of alternated space path connection is necessary in that it provides for the proper ionization and deionization of the tubes in response to an alternating-current potential applied to conductors 1 and 2 by alternating-current potential source 3 through current-limiting and lock-out resistor 4. In the embodiment of the invention shown in Fig. 1 the parallel connecting conductors 1 and 2 together with any potential probe $P_1$—$P_4$ and capacitor $C_1$—$C_4$ associated therewith and the starter anode connection to said probe-capacitor subcombination are the connections and components required for connecting a first stage of the counting circuit to a second stage. The chain is made reentrant so as to operate in a symmetrical ring by connecting probe $P_4$ to starting anode $S_1$ through conductor 5. This connection makes possible the priming of tube $T_1$ for subsequent ionization by breakdown of the main anode-cathode space path of tube $T_4$.

Circuit operation during counting is as follows: Let it be assumed tube $T_3$ is conducting in the main anode-cathode space path $A_3$—$K_3$. This tube conduction occurs in response to a positive potential on conductor 1 with respect to conductor 2 due to a positive alternating-current half-cycle from input source 3. Current flow to the potential probe $P_3$ which is located in the $A_3$—$K_3$ space path charges capacitor $C_3$ in the probe circuit to the floating probe potential, this potential being that at which current ceases to flow in the probe circuit. The floating probe potential value with respect to cathode $K_3$ is slightly less than the sustaining potential of the $A_3$—$K_3$ space path during ionization. The potential of capacitor $C_3$ due to the probe current biases the starter anode $S_4$ of $T_4$ so that the potential applied to conductors 1 and 2 from alternating-current source 3 by the following negative alternating-current half-cycle adds to the capacitor $C_3$ potential. Therefore, the potential across the starter anode-cathode space path $S_4$—$K_4$ in the primed tube $T_4$ is greater than that which appears across the starter space paths of any of the other tubes in the chain and as a result the starter anode-cathode $S_4$—$K_4$ space path breaks down. The discharge transfers to the main anode-cathode $A_4$—$K_4$ space path when the main anode $A_4$ is several volts more positive than $S_4$. Then during part of the remaining portion of this half-cycle, the current flow to the probe $P_4$ in the main anode-cathode $A_4$—$K_4$ space path charges capacitor $C_4$ to the floating probe potential. This potential is used to bias starting anode $S_1$ thereby priming $T_1$ for operation during the following half-cycle.

Because of the varying amplitude of the potential applied to conductors 1 and 2 by the alternating-current source 3, the circuit of this invention has the novel characteristic that the conducting tube immediately preceding a primed tube is made non-conducting for a time interval before each ionizing step is made. Tube $T_3$, for example, was ionized by the positive half-cycle of an alternating-current potential applied to conductors 1 and 2. As the time interval for this half-cycle approaches completion, the potential across the main anode-cathode $A_3$—$K_3$ space path of tube $T_3$ decreases to a value less than the ionization sustaining value. At this time no tube in the ring circuit is in a conducting state in any space path; however, tube $T_4$ is primed for subsequent ionization because the time constant of the discharge paths available to capacitor $C_3$, said discharge paths being in a deionized state, is sufficiently long to keep tube $T_4$ primed until the starter space path breakdown and anode transfer potential for tube $T_4$ are reached the following negative half-cycle.

If tube $T_4$ breaks down in the starter space path $S_4$—$K_4$ before the anode $A_4$ transfer potential is reached, that is, the $A_4$—$K_4$ potential required to transfer the discharge from the $S_4$—$K_4$ space path to the $A_4$—$K_4$ space path, then the discharge may be extinguished rather than transfer to the main space path. Because the potential across the starter space path of a primed tube is greater than the potential across the main space path of the same tube by the capacitor priming potential, the requirement to assure transfer is therefore that the starter space path breakdown potential must be greater than the anode transfer potential plus the capacitor priming potential.

The ring circuit of Fig. 1 starts at a random position when impulses are applied to conductors 1 and 2 as it is the inherent characteristics of the tubes which determine which tube will ionize in response to the first impulse. With such an arrangement it is possible that a given counting operation may be in error by a number representing three impulses. If, under certain conditions of sustained use, the over-all inaccuracy created by such a random starting arrangement is negligible to the accuracy of the counting results required, no starting circuit need be provided for. However, if impulse counting involving no initial starting error is required, the circuit may be started at a chosen position by precharging the appropriate capacitor. Precharging could be accomplished by connecting the selected capacitor to a direct-current potential source momentarily before applying the impulses to be counted to conductors 1 and 2.

If random self-starting is permissible a second tube requirement is specified. The starter space path breakdown potential must be less than the peak potential available from alternating-current source 3. In this case there is no priming capacitor potential to add to the potential across conductors 1 and 2 to assist in breaking down a starter space path. In order to insure stable operation it is also desirable to have the main space path breakdown potential greater than the peak potential across conductors 1 and 2 so that circuit operation will start due to starter space path ionization.

If a given capacitor is precharged to eliminate initial starting errors, this circuit has the unique characteristic that the peak potentials available from alternating-current source 3 can be smaller in value than the starter space path breakdown value as the potential across the precharged capacitor adds to the source potential to break down the starter space path for each counting step.

A transformer or any other circuit means well known in the art may be coupled to any tube in the ring for actuating a counting register or other output device. Transformer 6, for example, is shown connected to the main anode-cathode circuit of tube $T_4$. With this arrangement an output impulse appears at the secondary terminals of said transformer every fourth input half-cycle.

Electrode potentials of tube $T_3$ with respect to ground in a conducting half-cycle of the circuit of Fig. 1 are shown in Fig. 4. It is to be assumed that the circuit in Fig. 1 was in operation for several cycles at the time the values making up the curves of Fig. 4 were taken. Curve $abcd$ represents the potential of a sinusoidal positive half-cycle appearing at the output terminals of alternating-current source 3. Segment $ab$ also represents the potential of main anode $A_3$ as no current flows through series resistor 4 at this time. Segment $bopc$ represents the potential of main anode $A_3$ after breakdown of tube $T_3$. Curve $efghi$ represents the potential of starter anode $S_3$. Curve $jklmn$ represents the potential of probe $P_3$.

Segment $ef$ represents the potential of starter anode $S_3$ prior to breakdown. This segment is sinusoidal in shape and is at these times greater than the anode $A_3$ potential by a value equal to the potential across capacitor $C_2$. At $f$ the starter space path $S_3$—$K_3$ breaks down. From $g$ to $h$ the starter space path sustaining potential is maintained until at point $c$ the main space path starts to deionize due to the reduction of the source potential to a value less than the sustaining potential.

At point $b$, due to the ionization of the starter space path $S_3$—$K_3$ at point $f$, anode $A_3$ begins the potential drop to the value indicated by $o$, said value is determined by the sustaining potential of starter space path $S_3$—$K_3$ because any potential change across capacitor $C_2$ involves a time constant. At $p$ ionization transfer has been completed from the starter space path $S_3$—$K_3$ to the main space path $A_3$—$K_3$. From $p$ to $c$ the main space path sustaining potential is maintained until at $c$ the potential of the alternating-current source 3 drops to a value that is smaller than the sustaining value of the main space path $A_3$—$K_3$.

During the time tube $T_3$ is conducting the potential of the probe $P_3$ rises from the negative value indicated by $jk$ to the positive value $lm$. During $kl$ capacitor $C_3$ is being charged until at $l$ the floating probe potential is reached.

When the source potential decreases to a value less than the sustaining value at $c$, the potential of the starter anode $S_3$ decreases at $h$ as does the potential of the probe $P_3$ at $m$. The probe does not fall to a negative value substantially equal to that at $j$ until tube $T_4$ is conducting, at which time probe $P_3$ assumes a negative potential due to the potential changes occurring in tube $T_4$.

Due to the repeating nature of the circuit of this invention the curves just described apply also to tube $T_1$ when that tube is in a primed condition. The same curves also apply to tubes $T_2$ and $T_4$, if the potentials are taken as measured with respect to conductor 2.

As cold cathode gas tubes suitable for use in the circuit of this invention were not available, suitable tubes were designed, Fig. 3 being a front view thereof and Fig. 2 being a plan view of the electrode structures thereof, the vitreous envelope being omitted.

An old type tube base was used for supporting and making connections to the tube electrodes. All of the electrodes were constructed from nickel. The starter anode $S_1$ and the cathode $K_1$ were coated with barium oxide and each had an active area of approximately 0.11 square inch; they were each supported from and connected to two prongs of the base.

In the tube the starter anode is between the main anode and the cathode whereas the probe is behind the cathode. This positioning is desirable in order to keep the breakdown potentials between the main anode to probe and the starter anode to probe at a high value. Consequently, there should be enough current in the main anode-cathode space path during ionization to ionize the probe side as well as the anode side of the cathode. In order to force the discharge to the rear of the cathode with the least peak current, a cylindrical cathode instead of a plane one is preferred.

The main anode should preferably be located with respect to the cathode so that a line-of-sight or unobstructed path exists between said electrodes. The outer surfaces of the starter anode $S_1$, cathode $K_1$, and probe $P_1$ preferably lie in a plane, as illustrated in Fig. 2.

Tubes of this electrode structure filled with argon gas at a pressure of 15 millimeters of mercury operate satisfactorily in a circuit arrangement in which alternating-current source 3 has a peak potential of 165 volts at a 60-cycle frequency, resistor 4 has a value of 10,000 ohms, and capacitors $C_1$, $C_2$, $C_3$ and $C_4$ have a capacitance value of 0.01 microfarad each.

The above-describe arrangements are illustrative of the application of the principles of the invention. Numerous other circuit arrangements including changes in the component values listed herein and use of different tube electrode structures may be employed by persons skilled in the art without departing from the scope of the invention.

What is claimed is:

1. In a counter circuit, two or more gaseous discharge tubes connected in an endless operative chain, each of said tubes having at least a main anode, a starter anode, a cathode, and a potential probe, each of said potential probes being connected directly to the starter anode of the tube next in the chain, a plurality of capacitors individually shunting the main anode-starter anode space path of each of said gaseous discharge tubes, a plurality of conductors for connecting the main anode-cathode space paths of all of said gaseous discharge tubes to one another in a low impedance parallel connection, a series of resistance element, an alternating-current impulse source for applying a potential to said parallel connected main anode-cathode space path through said series resistance element, and an output circuit.

2. A ring counting circuit comprising a plurality of gaseous discharge tubes, each of said tubes having at least a main space path and a starter space path, the main space paths of said tubes being connected into a parallel connection with the individual branches thereof successively alternating in space path direction, means for coupling the main space path of each of said tubes to the starter space path of the tube next in the ring, an alternating-current input source, means for connecting said alternating-current source to the starter space path of each of said tubes, and means for connecting said alternating-current source to said parallel connected main space paths.

3. The combination comprising two gaseous discharge paths, each including an electron discharge electrode and an anode, the anode of each path being connected to the electron discharge electrode of the other path, a probe electrode positioned in the discharge region of one of said paths and being connected to means for initiating a discharge in the other of said paths, and a capacitor connected between the probe electrode and the electron discharge electrode of the path having said probe electrode.

4. The combination comprising two gaseous discharge paths, each including an electron discharge electrode and an anode, the anode of each path being connected to the electron discharge electrode of the other path, and a probe electrode positioned in the discharge region of one of said paths and being connected to means for initiating a discharge in the other of said paths.

5. A circuit responsive step by step to the successive half-cycles of an alternating-current input potential comprising a series of parallel connected gaseous discharge space paths in which the individual space path branches successively alternate in polarity, a plurality of means individually associated with each gaseous discharge space path responsive to the ionization of said space path, a plurality of means individually associated with each gaseous discharge space path for initiating a discharge therein, the ionization responsive means of each of said space paths being individually connected to the discharge initiating means of the space path next in the series whereby ionization in any space path subsequently initiates a discharge in the space path next in the series, and a potential source for applying an alternating-current potential to said parallel connected gaseous space paths.

6. The combination comprising two space paths, each including an electron discharge electrode and an anode, one of said space paths having an electrostatic potential probe positioned therein, the other of said space paths having an auxiliary electrode positioned therein, and means for coupling said electrostatic potential probe to said auxiliary electrode.

DAVID B. PARKINSON.

No references cited.